US012634048B2

(12) United States Patent
Ji et al.

(10) Patent No.: US 12,634,048 B2
(45) Date of Patent: May 19, 2026

(54) METHOD FOR DETERMINING TIME DOMAIN POSITION OF RESOURCE AND TRANSMIT END

(71) Applicant: VIVO MOBILE COMMUNICATION CO., LTD., Dongguan (CN)

(72) Inventors: Zichao Ji, Dongguan (CN); Siqi Liu, Dongguan (CN); Shuyan Peng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 522 days.

(21) Appl. No.: 17/990,214

(22) Filed: Nov. 18, 2022

(65) Prior Publication Data

US 2023/0082792 A1    Mar. 16, 2023

Related U.S. Application Data

(63) Continuation of application No. PCT/CN2021/095116, filed on May 21, 2021.

(30) Foreign Application Priority Data

May 21, 2020    (CN) .......................... 202010437684.7

(51) Int. Cl.
  *H04L 1/1829* (2023.01)
  *H04L 1/1812* (2023.01)
  *H04W 72/1263* (2023.01)

(52) U.S. Cl.
  CPC .......... *H04L 1/1854* (2013.01); *H04L 1/1861* (2013.01); *H04W 72/1263* (2013.01); *H04L 1/1812* (2013.01)

(58) Field of Classification Search
  CPC ... H04L 1/1854; H04L 1/1861; H04L 1/1812; H04W 72/1263

(Continued)

(56) References Cited

U.S. PATENT DOCUMENTS

| | | | |
|---|---|---|---|
| 2021/0321396 A1* | 10/2021 | Li | H04W 72/23 |
| 2022/0303952 A1* | 9/2022 | Hoang | H04W 72/542 |
| 2023/0231654 A1* | 7/2023 | Ganesan | H04L 5/0044 |
| | | | 370/329 |

FOREIGN PATENT DOCUMENTS

| | | |
|---|---|---|
| CN | 107592984 A | 1/2018 |
| WO | 2020/085854 A1 | 4/2020 |

OTHER PUBLICATIONS

China National Intellectual Property Administration, International Search Report issued in corresponding Application No. PCT/CN2021/095116, mailed Aug. 11, 2021.

(Continued)

*Primary Examiner* — Christopher B Robinson
*Assistant Examiner* — Chong G Kim
(74) *Attorney, Agent, or Firm* — The Webb Law Firm

(57) ABSTRACT

The present disclosure provides a resource determining and transmission method, and a transmit end. The resource determining method includes: determining that a time domain position of a second target resource of a first TB is after a time domain position in which feedback information corresponding to a first target resource is located. The resource transmission method includes: during second TB transmission, in a case that a transmission interval between a third target resource and a fourth target resource of a second TB does not satisfy an HARQ RTT condition, perform transmission control, so that the transmission interval between transmission resources in the second TB transmission satisfies the HARQ RTT condition.

9 Claims, 5 Drawing Sheets

Start

Determine that a time domain position of a second target resource of a first transport block (TB) is after a time domain position in which feedback information corresponding to a first target resource is located — 501

End

(58) Field of Classification Search
USPC ......................................................... 370/329
See application file for complete search history.

(56) References Cited

OTHER PUBLICATIONS

3GPP TSG RAN WG1 #99. Reno, USA, Nov. 18-22, 2019. R1-1912577. Spreadtrum Communications. Discussion on NR sidelink Mode 2 resource allocation. See ISR.
3GPP TSG RAN WG1 #100-e. e-Meeting, Feb. 24-Mar. 6, 2020. R1-2000403. ZTE, Sanechips. Remaining issues of mode 2 resource allocation. See ISR.

* cited by examiner

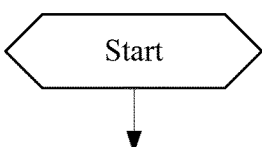

During second transport block (TB) transmission, in a case that a transmission interval between a third target resource and a fourth target resource of a second TB does not satisfy a hybrid automatic repeat request round-trip time (HARQ RTT) condition, perform transmission control, so that the transmission interval between transmission resources in the second TB transmission satisfies the HARQ RTT condition  801

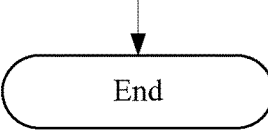

FIG. 8

Transmit end 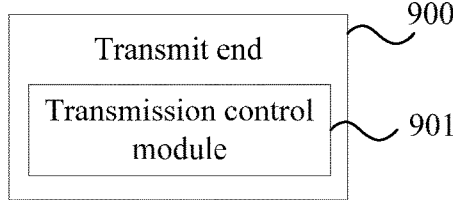 900

Transmission control module 901

FIG. 9

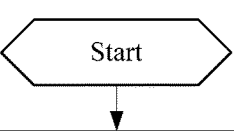

When the transmit end transmits a third transmission block (TB), in a case that a transmission interval between a fifth target resource and a sixth target resource in the third TB does not satisfy a hybrid automatic repeat request round-trip time (HARQ RTT) condition, perform feedback control based on a demodulation result for K times of physical sidelink shared channel (PSSCH) transmission and/or physical sidelink control channel (PSCCH) transmission of the third TB  1001

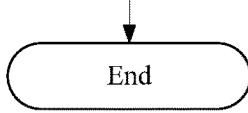

FIG. 10

METHOD FOR DETERMINING TIME DOMAIN POSITION OF RESOURCE AND TRANSMIT END

CROSS-REFERENCE TO RELATED APPLICATIONS

This application is a continuation of International Application No. PCT/CN2021/095116, filed on May 21, 2021, which claims priority to Chinese Patent Application No. 202010437684.7, filed in China on May 21, 2020, which are incorporated herein by reference in their entireties.

TECHNICAL FIELD

The present disclosure relates to the field of communications technologies, and in particular, to a resource determining, transmission, and feedback method, a transmit end, and a receive end.

BACKGROUND

In sidelink (SL) transport block (TB) transmission based on a hybrid automatic repeat request (HARQ) feedback, transmit user equipment (TX UE, also known as a transmit end) needs to decide whether to perform next PSSCH retransmission based on a feedback result of the previous physical sidelink shared channel (PSSCH) transmission. However, in the existing SL transmission, it is not always guaranteed that resources in the next PSSCH transmission appear after the TX UE demodulates the feedback information, which may cause problems such as the waste of resources, redundant feedback information, and the like.

SUMMARY

According to a first aspect of the present disclosure, a resource determining method, applied to a transmit end, is provided, which includes:

determining that a time domain position of a second target resource of a first transport block (TB) is after a time domain position in which feedback information corresponding to a first target resource is located, where the first target resource is a physical sidelink shared channel (PSSCH) transmission resource and/or a physical sidelink control channel (PSCCH) transmission resource; and the second target resource is a PSSCH transmission resource and/or a PSCCH transmission resource.

According to a second aspect of the present disclosure, a resource transmission method, applied to a transmit end, is provided, which includes:

during second transport block (TB) transmission, in a case that a transmission interval between a third target resource and a fourth target resource of a second TB does not satisfy a hybrid automatic repeat request round-trip time (HARQ RTT) condition, performing transmission control, so that the transmission interval between transmission resources in the second TB transmission satisfies the HARQ RTT condition, where the third target resource is a physical sidelink shared channel (PSSCH) transmission resource and/or a physical sidelink control channel (PSCCH) transmission resource; and the fourth target resource is a PSSCH transmission resource and/or a PSCCH transmission resource.

According to a third aspect of the present disclosure, a resource feedback method, applied to a receive end, is provided, which includes:

when the transmit end transmits a third transmission block (TB), in a case that a transmission interval between a fifth target resource and a sixth target resource in the third TB does not satisfy a hybrid automatic repeat request round-trip time (HARQ RTT) condition, performing feedback control based on a demodulation result for K times of physical sidelink shared channel (PSSCH) transmission and/or physical sidelink control channel (PSCCH) transmission of the third TB, where K is an integer greater than or equal to 1.

According to a fourth aspect of the present disclosure, a resource transmission method, applied to a transmit end, is provided, which includes:

during fourth transport block (TB) transmission, in a case that a transmission interval between a seventh target resource and an eighth target resource of a fourth TB does not satisfy a hybrid automatic repeat request round-trip time (HARQ RTT) condition, performing blind retransmission of the fourth TB, where the seventh target resource is a physical sidelink shared channel (PSSCH) transmission resource and/or a physical sidelink control channel (PSCCH) transmission resource; and the eighth target resource is a PSSCH transmission resource and/or a PSCCH transmission resource.

According to a fifth aspect of the present disclosure, a transmit end, is provided, which includes:

a determining module, configured to determine that a time domain position of a second target resource of a first transport block (TB) is after a time domain position in which feedback information corresponding to a first target resource is located, where the first target resource is a physical sidelink shared channel (PSSCH) transmission resource and/or a physical sidelink control channel (PSCCH) transmission resource; and the second target resource is a PSSCH transmission resource and/or a PSCCH transmission resource.

According to a sixth aspect of the present disclosure, a transmit end, is provided, which includes:

a transmission control module, configured to: during second transport block (TB) transmission, in a case that a transmission interval between a third target resource and a fourth target resource of a second TB does not satisfy a hybrid automatic repeat request round-trip time (HARQ RTT) condition, perform transmission control, so that the transmission interval between transmission resources in the second TB transmission satisfies the HARQ RTT condition, where the third target resource is a physical sidelink shared channel (PSSCH) transmission resource and/or a physical sidelink control channel (PSCCH) transmission resource; and the fourth target resource is a PSSCH transmission resource and/or a PSCCH transmission resource.

According to a seventh aspect of the present disclosure, a transmit end, is provided, which includes:

a transmission module, configured to: during fourth transport block (TB) transmission, in a case that a transmission interval between a seventh target resource and an eighth target resource of a fourth TB does not satisfy a hybrid automatic repeat request round-trip time (HARQ RTT) condition, perform blind retransmission of the fourth TB, where the seventh target resource is a physical sidelink shared channel (PSSCH) transmission resource and/or a physical sidelink control channel (PSCCH) transmission resource; and the eighth target resource is a PSSCH transmission resource and/or a PSCCH transmission resource.

According to an eighth aspect of the present disclosure, a transmit end is provided, which includes a memory, a processor, and a program or an instruction stored in the memory and executable on the processor, where when the program or the instruction is executed by the processor, steps of the resource determining method and steps of the resource transmission method are implemented.

According to a ninth aspect of the present disclosure, a receive end is provided, which includes:

a feedback control module, configured to: when the transmit end transmits a third transmission block (TB), in a case that a transmission interval between a fifth target resource and a sixth target resource in the third TB does not satisfy a hybrid automatic repeat request round-trip time (HARQ RTT) condition, perform feedback control based on a demodulation result for K times of physical sidelink shared channel (PSSCH) transmission and/or physical sidelink control channel (PSCCH) transmission of the third TB, where K is an integer greater than or equal to 1.

According to a tenth aspect of the present disclosure, a receive end is provided, which includes a memory, a processor, and a program or an instruction stored in the memory and executable on the processor, where when the program or the instruction is executed by the processor, steps of the resource feedback method are implemented.

According to an eleventh aspect of the present disclosure, a readable storage medium is provided, where the readable storage medium stores a program or an instruction, and when the program or the instruction is executed by a processor, steps of the resource determining method, steps of the resource transmission method, or steps of the resource feedback method are implemented.

According to a twelfth aspect of the present disclosure, a computer program product is provided, where the computer program product is stored in a non-volatile storage medium, and the program product is executed by at least one processor to implement steps of the resource determining method, steps of the resource transmission method, or steps of the resource feedback method.

BRIEF DESCRIPTION OF DRAWINGS

FIG. 8 is a first schematic flowchart of a resource transmission method according to an embodiment of the present disclosure;

FIG. 9 is a second schematic diagram of modules of a transmit end according to an embodiment of the present disclosure;

FIG. 10 is a schematic flowchart of a resource feedback method according to an embodiment of the present disclosure;

DESCRIPTION OF EMBODIMENTS

Figure 1:
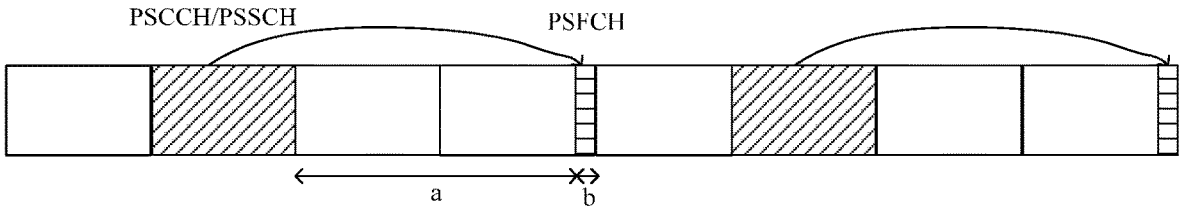
FIG. 1 is a first schematic diagram of slots occupied by a and b in the prior art.

To make the objects, technical solutions, and advantages of the present disclosure clearer, the following describes the present disclosure in detail in conjunction with the accompanying drawings and specific embodiments.

Some concepts related to the embodiments of the present disclosure are first described below.

1. A Sidelink (SL for Short) Hybrid Automatic Repeat Request (HARQ) Feedback

In order to improve the reliability and effectiveness of sidelink transmission, SL HARQ is introduced into the New Radio (NR) Vehicle to Everything (V2X). A sending node sends data/transport block (TB) to a receiving node on the SL, and the receiving node determines whether the data is received successfully. If the data is received successfully, the receiving node feeds back an acknowledgement (ACK) to the sending node, otherwise, the receiving node feeds back a negative acknowledgement (NACK).

The SL supports unicast, groupcast, and broadcast transmission, where the unicast and groupcast transmission needs to support an SL HARQ feedback. As for the unicast transmission, receive user equipment (RX UE, also referred to as a receive end) feeds back the ACK/NACK on a physical sidelink feedback channel (PSFCH) resource thereof. As for the groupcast transmission, there are at least two feedback forms: case 1, the RX UE shares the PSFCH resource, and the RX UE only feeds back the NACK. In a case that TB demodulation is successful, the RX UE does not give any feedback; and case 2, the RX UE occupies different PSFCH resources, and the RX UE feeds back the ACK/NACK on corresponding resources.

The foregoing TB transmission is performed on a physical sidelink shared channel (PSSCH) resource, and the ACK/NACK transmission is performed on a corresponding PSFCH resource (namely, a corresponding PSFCH).

2. A Physical Sidelink Control Channel (PSCCH)/PSSCH Retransmission Form

The sidelink supports two types of PSSCH retransmission forms, one is HARQ feedback based retransmission, and the other is blind retransmission. If the transmit user equipment (TX UE, also referred to as the transmit end) adopts the HARQ feedback based retransmission, the RX UE needs to perform HARQ feedback on the PSSCH transmitted by the TX UE, and the TX UE decides whether to retransmit the PSSCH based on the HARQ feedback; if the TX UE adopts a retransmission method of blind retransmission, the TX UE directly performs PSSCH transmission on the retransmission resource.

3. Resource Selection of the Sidelink

There are at least two resource allocation methods of sidelink: a mode 1 and a mode 2. For the mode 1, the control node may allocate a transmission resource to the TX UE, and for the mode 2, the TX UE may autonomously select a transmission resource.

At least in the mode 2, in order to ensure that the PSSCH retransmission resource appears after the TX UE demodulates the feedback information, it is stipulated that a time interval between any two selected PSSCH transmission resources should be greater than an HARQ round-trip time (RTT) (namely, the following Z=a+b is the HARQ RTT time).

a is a time interval between an end of a last symbol transmitted on a PSSCH of a first resource and a start of a first symbol received on a corresponding PSFCH, which is determined by higher layer parameters of MinTimeGapPSFCH and periodPSFCHresource configured by a resource pool; and b is a receipt time of the PSFCH, a receipt and processing time of the PSFCH, or a time required for receipt and processing, and retransmission preparation of the PSFCH, including multiplexing of necessary physical channels and any TX-RX/RX-TX switching time, which is determined by the UE.

It should also be noted herein that if there is no corresponding PSFCH for the PSSCH transmission resource, a value of Z may be assumed to be 0, an infinitely small value, or an infinitely great value.

Figure 2:
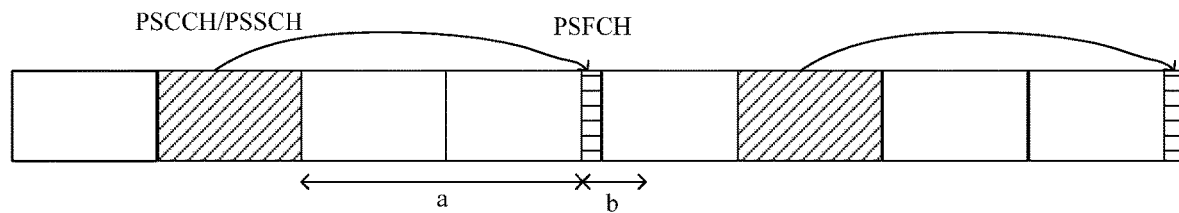
FIG. 2 is a second schematic diagram of slots occupied by a and b in the prior art.

FIG. 1 and FIG. 2 are schematic diagrams of a and b, where a value of b is relatively small in FIG. 1, and receipt and processing/retransmission preparation of the PSFCH can be completed in a slot in which the PSFCH is located; and in FIG. 2, the value of b is relatively large, and therefore, the time for receipt and processing/retransmission preparation of the PSFCH may cross slots. FIG. 1 is a general situation, but the case of FIG. 2 cannot be excluded. In FIG. 1 and FIG. 2, boxes filled with slashes are PSCCH/PSSCH transmission resources, and boxes filled with transverse lines are PSFCH transmission resources.

4. Resource Reservation of the Sidelink

The TX UE may reserve resources during allocation (the reservation includes periodic reservation and aperiodic reservation), and the reserved resources may be used for future PSCCH and/or PSSCH transmission. In addition, as for the periodic reservation, reserved resources in each period are used to transmit a same TB.

In resource selection of the mode 2, the problem is avoided as much as possible. However, when the TX UE performs resource reservation (for example, the periodic resource reservation), it is inevitable that two adjacent PSSCH transmission resources do not satisfy the HARQ RTT time, as shown in FIG. 3 and FIG. 4 (only part of problems are exemplified in the present disclosure, and other problems are not excluded).

Figure 3:
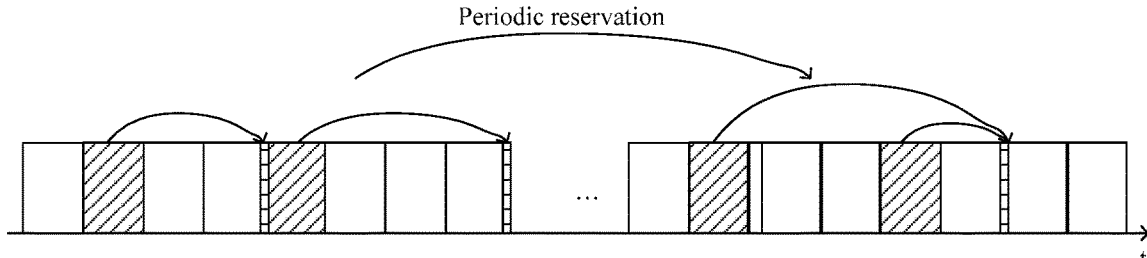
FIG. 3 is a schematic diagram of a first case of periodic reservation.
Figure 4:
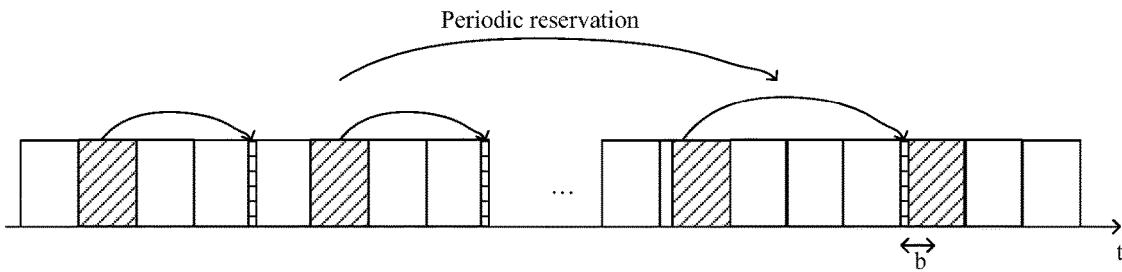
FIG. 4 is a schematic diagram of a second case of periodic reservation.

As for the case shown in FIG. 3, two adjacent PSSCH resources that are reserved are corresponding to a same PSFCH occasion. As for the case shown in FIG. 4, although two adjacent reservations are corresponding to different PSFCH occasions, it takes a long time for the TX UE to process the PSFCH fed back by the previous PSSCH. As a result, the TX UE cannot prepare for the PSSCH retransmission when a next PSSCH transmission resource arrives. The case shown in FIG. 3 is a general situation, but the case shown in FIG. 4 cannot be excluded. In FIG. 3 and FIG. 4, boxes filled with slashes are PSCCH/PSSCH transmission resources, and boxes filled with transverse lines are PSFCH transmission resources.

The present disclosure provides a resource determining, transmission, and feedback method, a transmit end, and a receive end, to solve the problem that in the existing SL transmission, it is not always maintained that resources in the next PSSCH transmission appear after the transmit user equipment demodulates the feedback information, which may cause the waste of resources, redundant feedback information, and the like.

Figures 5, 6:
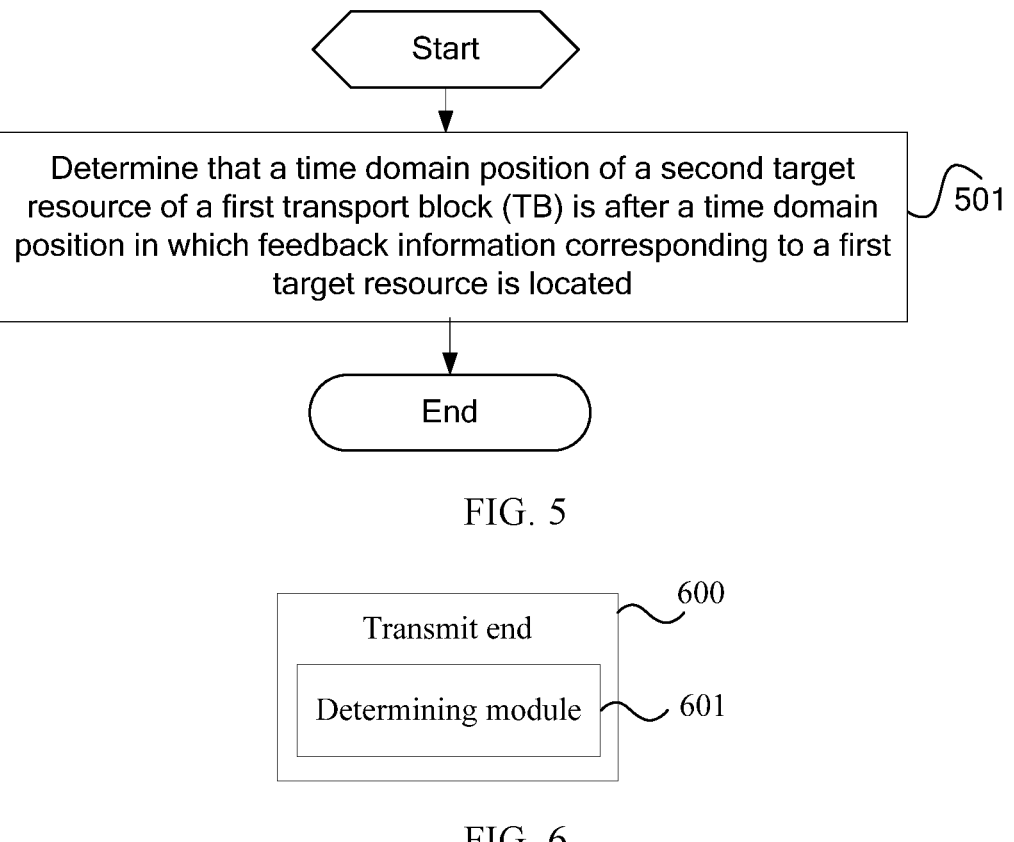
FIG. 5 is a schematic flowchart of a resource determining method according to an embodiment of the present disclosure.
FIG. 6 is a first schematic diagram of modules of a transmit end according to an embodiment of the present disclosure.

As shown in FIG. 5, an embodiment of the present disclosure provides a resource determining method, applied to a transmit end, and including the following step.

Step 501. Determine that a time domain position of a second target resource of a first transport block (TB) is after a time domain position in which feedback information corresponding to a first target resource is located.

The first target resource is a physical sidelink shared channel (PSSCH) transmission resource and/or a physical sidelink control channel (PSCCH) transmission resource; and the second target resource is a PSSCH transmission resource and/or a PSCCH transmission resource. The feedback information corresponding to the first target resource mentioned in this embodiment of the present disclosure refers to the PSFCH feedback corresponding to data transmitted on the first target resource, and the data transmitted on the first target resource refers to PSSCH information and/or PSCCH information.

It should be noted that the transmit end refers to a terminal that performs PSSCH and/or PSCCH transmission during the SL communication process.

It should be further noted that the first TB refers to any TB that the transmit end needs to transmit during information transmission, and both the second target resource and the first target resource refer to resources of the first TB at different transmission moments.

It should be noted that, in this embodiment of the present disclosure, that the transmit end determines that a time domain position of a second target resource of a first TB is after a time domain position in which feedback information corresponding to a first target resource is located may be: the transmit end obtains resource allocation information from the control node, and determines that the time domain location of the second target resource of the first TB is after the time domain position in which the feedback information corresponding to the first target resource is located, or may be: the transmit end performs resource allocation, and determines that the time domain location of the second target resource of the first TB is after the time domain position in which the feedback information corresponding to the first target resource is located.

Alternatively, in this embodiment of the present disclosure, step 501 may be implemented in at least one of the following manners:

A11. During resource allocation, a time interval between allocating the first target resource and the second target resource of the first TB is at least greater than or greater than or equal to a hybrid automatic repeat request round-trip time (HARQ RTT), and for transmission resources of other TBs that are periodically reserved after the time domain resource in which the first TB is located, a time interval between reserved transmission resources in each period is at least greater than or greater than or equal to the HARQ RTT.

It should be noted that the HARQ RTT mentioned later in this implementation and in this embodiment of the present disclosure is equal to a+b, where a is a time interval between an end moment of a last symbol transmitted on a PSSCH and/or PSCCH of a first target resource and a start moment of a first symbol received on a corresponding PSFCH; and b is a receipt time of the PSFCH, a receipt and processing time of the PSFCH, or a time required for receipt and processing, and retransmission preparation of the PSFCH.

It should be noted that the resource allocation in this case mainly refers to resource selection performed by the transmit end.

In other words, in this manner, when the transmit end performs resource selection, it should be guaranteed that a time interval between any two transmission resources (namely, the PSSCH transmission resource and/or PSCCH transmission resource) of any TB is at least greater than (in the embodiments of the present disclosure, "greater than" represents a data symbol of ">") the HARQ RTT, or when the transmit end performs resource selection, it should be guaranteed that a time interval between any two transmission resources (namely, the PSSCH transmission resource and/or PSCCH transmission resource) of any TB is at least greater than or equal to (in the embodiments of the present disclosure, "greater than or equal to" represents "≥") the HARQ RTT; further, for transmission resources of other TBs periodically reserved after the time domain resource in which the first TB is located, a reserved transmission resource in each period also needs to satisfy the foregoing condition, while a reserved transmission resource between periods does not need to satisfy the foregoing condition.

This manner can also be understood as: obtaining a resource that a control node allocates to a transmit end during resource allocation, and an expectation of the transmit end to the allocated resource is that a time interval between any two transmission resources (namely, the PSSCH transmission resource and/or PSCCH transmission resource) of any TB is at least greater than (in the embodiments of the present disclosure, "greater than" represents a data symbol of ">") the HARQ RTT, or obtaining a resource that a control node allocates to a transmit end during resource allocation, and an expectation of the transmit end to the allocated resource is that a time interval between any two transmission resources (namely, the PSSCH transmission resource and/or PSCCH transmission resource) of any TB is at least greater than or equal to (in the embodiments of the present disclosure, "greater than or equal to" represents "≥") the HARQ RTT; further, for transmission resources of other TBs periodically reserved after the time domain resource in which the first TB is located, a reserved transmission resource in each period also needs to satisfy the foregoing condition, while a reserved transmission resource between periods does not need to satisfy the foregoing condition.

It should be noted that this manner can avoid the cases in FIG. 3 and FIG. 4.

A12. During resource allocation, a time interval between allocating the first target resource and the second target resource of the first TB is at least greater than or greater than or equal to a physical sidelink feedback channel (PSFCH) period.

It should be noted that the resource allocation in this case mainly refers to resource selection performed by the transmit end.

In other words, in this manner, when the transmit end performs resource selection, it should be guaranteed that a time interval between any two transmission resources (namely, the PSSCH transmission resource and/or PSCCH transmission resource) of any TB is at least greater than (in the embodiments of the present disclosure, "greater than" represents a data symbol of ">") the PSFCH period, or when the transmit end performs resource selection, it should be guaranteed that a time interval between any two transmission resources (namely, the PSSCH transmission resource and/or PSCCH transmission resource) of any TB is at least greater than or equal to (in the embodiments of the present disclosure, "greater than or equal to" represents "≥") the PSFCH period.

This manner can also be understood as: obtaining a resource that a control node allocates to a transmit end during resource allocation, and an expectation of the transmit end to the allocated resource is that a time interval between any two transmission resources (namely, the PSSCH transmission resource and/or PSCCH transmission resource) of any TB is at least greater than (in the embodiments of the present disclosure, "greater than" represents a data symbol of ">") the PSFCH period, or obtaining a resource that a control node allocates to a transmit end during resource allocation, and an expectation of the transmit end to the allocated resource is that a time interval between any two transmission resources (namely, the PSSCH transmission resource and/or PSCCH transmission resource) of any TB is at least greater than or equal to (in the embodiments of the present disclosure, "greater than or equal to" represents "≥") the PSFCH period.

A13. During resource reservation, a time interval between the first target resource and the second target resource of the first TB is at least greater than or greater than or equal to the HARQ RTT.

It should be noted that the first TB herein refers to one or more future TBs (namely, TBs to be transmitted). The transmit end reserves resources for the TBs to be transmitted during previous TB transmission.

In other words, in this manner, when the transmit end performs resource reservation, it should be guaranteed that a time interval between any two transmission resources (namely, the PSSCH transmission resource and/or PSCCH transmission resource) of any TB is at least greater than the HARQ RTT, or when the transmit end performs resource reservation, it should be guaranteed that a time interval between any two transmission resources (namely, the PSSCH transmission resource and/or PSCCH transmission resource) of any TB is at least greater than or equal to (in the embodiments of the present disclosure, "greater than or equal to" represents "≥") the HARQ RTT.

This manner can also be understood as: obtaining a resource that a control node allocates to a transmit end during resource allocation, and an expectation of the transmit end to the allocated resource is that a time interval between any two transmission resources (namely, the PSSCH transmission resource and/or PSCCH transmission resource) of any TB is at least greater than the HARQ RTT, or obtaining a resource that a control node allocates to a transmit end during resource allocation, and an expectation of the transmit end to the allocated resource is that a time interval between any two transmission resources (namely, the PSSCH transmission resource and/or PSCCH transmission resource) of any TB is at least greater than or equal to (in the embodiments of the present disclosure, "greater than or equal to" represents "≥") the HARQ RTT.

A14. During resource reservation, in a case that a process in which the first TB is located supports periodic reservation, configure a resource reservation period of the process in which the first TB is located to be an integer multiple of the PSFCH period, where the process is a sidelink process (SL process) or a sidelink reservation process (SL reservation process).

In other words, in this manner, when the transmit end performs resource reservation, a period of resource reservation for a process of a same TB is an integer multiple of the PSFCH period.

This manner can also be understood as: obtaining a resource that a control node allocates to a transmit end during resource allocation, and an expectation of the transmit end to the allocated resource is that a period of resource reservation for a process of a same TB is an integer multiple of the PSFCH period.

A15. Obtain a resource that a control node allocates to a transmit end during resource allocation, where an expectation of the transmit end to the allocated resource is that a time interval between the first target resource and the second target resource of the first TB is at least greater than or greater than or equal to the HARQ RTT.

In other words, in this manner, the transmit end needs to obtain a resource that a control node allocates to a transmit end during resource allocation, and an expectation of the transmit end to the allocated resource is that a time interval between the first target resource and the second target resource of the first TB is at least greater than the HARQ RTT, or the transmit end needs to obtain a resource that a control node allocates to a transmit end during resource allocation, and an expectation of the transmit end to the allocated resource is that a time interval between the first target resource and the second target resource of the first TB is at least greater than or equal to (in the embodiments of the present disclosure, "greater than or equal to" represents "≥") the HARQ RTT.

A16. During resource allocation, a time interval between allocating the first target resource and the second target resource of the first TB is at least greater than or greater than or equal to a maximum HARQ RTT, and for transmission resources of other TBs that are periodically reserved after the time domain resource in which the first TB is located, a time interval between reserved transmission resources in each period being at least greater than or greater than or equal to the HARQ RTT.

It should be noted that since a value of the HARQ RTT is a range, there are maximum and minimum values of the HARQ RTT in actual use. This indicates that the transmit end needs to ensure, during resource allocation, that the time interval between the first target resource and the second target resource of the first TB is at least greater than the maximum HARQ RTT (namely, greater than the maximum value of the HARQ RTT), or the transmit end needs to ensure, during resource allocation, that the time interval between the first target resource and the second target resource of the first TB is at least greater than or equal to (in the embodiments of the present disclosure, "greater than or equal to" represents "≥") the maximum HARQ RTT (namely, greater than or equal to the maximum value of the HARQ RTT); further, for transmission resources of other TBs periodically reserved after the time domain resource in which the first TB is located, a reserved transmission resource in each period also needs to satisfy that the time interval between reserved transmission resources is at least greater than or greater than or equal to the HARQ RTT, while a reserved transmission resource between periods does not need to satisfy that the time interval between reserved transmission resources is at least greater than or greater than or equal to the HARQ RTT.

It should be noted that this embodiment of the present disclosure is at least applicable to HARQ feedback based PSSCH retransmission and/or PSCCH retransmission, that is, the second target resource and the first target resource in this embodiment of the present disclosure are used for the HARQ feedback based PSSCH retransmission and/or PSCCH retransmission.

It should also be noted that in the foregoing implementation of this embodiment of the present disclosure, a same sidelink process or sidelink reservation process cannot be used for HARQ feedback based retransmission and blind retransmission. This limitation is especially applicable to the foregoing implementations A13 and A14.

It should be noted that in this embodiment of the present disclosure, resource determination is limited from a perspective of the transmit end performing resource determination, to avoid that two adjacent times of PSSCH transmission and/or PSCCH transmission do not satisfy a time limit of the HARQ RTT, which avoids the waste of resources as much as possible.

As shown in FIG. 6, an embodiment of the present disclosure provides a transmit end 600, including:

a determining module 601, configured to determine that a time domain position of a second target resource of a first transport block (TB) is after a time domain position in which feedback information corresponding to a first target resource is located, where the first target resource is a physical sidelink shared channel (PSSCH) transmission resource and/or a physical sidelink control channel (PSCCH) transmission resource; and the second target resource is a PSSCH transmission resource and/or a PSCCH transmission resource.

Alternatively, the determining module 601 is configured to implement at least one of the following:

during resource allocation, a time interval between allocating the first target resource and the second target resource of the first TB being at least greater than or greater than or equal to a hybrid automatic repeat request round-trip time (HARQ RTT), and for transmission resources of other TBs that are periodically reserved after the time domain resource in which the first TB is located, a time interval between reserved transmission resources in each period being at least greater than or greater than or equal to the HARQ RTT;

during resource allocation, a time interval between allocating the first target resource and the second target resource of the first TB being at least greater than or greater than or equal to a physical sidelink feedback channel (PSFCH) period;

during resource reservation, a time interval between the first target resource and the second target resource of the first TB being at least greater than or greater than or equal to the HARQ RTT;

during resource reservation, in a case that a process in which the first TB is located supports periodic reservation, configuring a resource reservation period of the process in which the first TB is located to be an integer multiple of the PSFCH period, where the process is a sidelink process or a sidelink reservation process;

obtaining a resource that a control node allocates to a transmit end during resource allocation, where an expectation of the transmit end to the allocated resource is that a time interval between the first target resource and the second target resource of the first TB is at least greater than or greater than or equal to the HARQ RTT; and during resource allocation, a time interval between allocating the first target resource and the second target resource of the first TB being at least greater than or greater than or equal to a maximum HARQ RTT, and for transmission resources of other TBs that are periodically reserved after the time domain resource in which the first TB is located, a time interval between reserved transmission resources in each period being at least greater than or greater than or equal to the HARQ RTT.

Optionally, a same sidelink process or sidelink reservation process cannot be simultaneously used for hybrid automatic repeat request (HARQ) feedback based retransmission and blind retransmission.

Alternatively, the second target resource and the first target resource are used for hybrid automatic repeat request (HARQ) feedback based PSSCH retransmission and/or PSCCH retransmission.

It should be noted that this transmit end embodiment is a transmit end corresponding to the resource determining method applied to the transmit end. All implementations of the foregoing embodiments are applicable to this transmit end embodiment, and a same technical effect can also be achieved.

Figure 7:
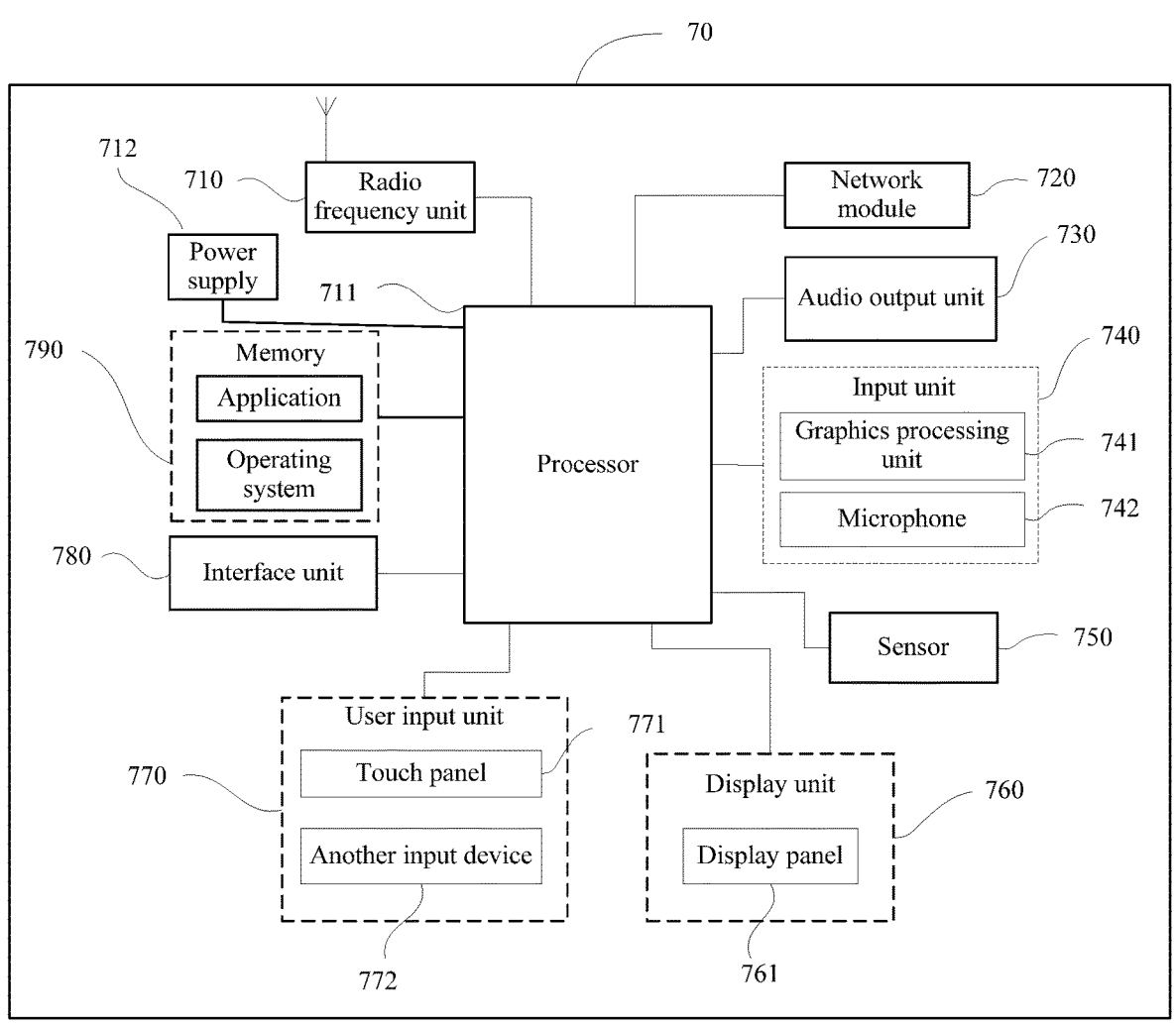
FIG. 7 is a structural block diagram of a transmit end according to an embodiment of the present disclosure.

FIG. 7 is a schematic diagram of a hardware structure of a transmit end according to an embodiment of the present disclosure.

The transmit end 70 includes, but is not limited to, components such as a radio frequency unit 710, a network module 720, an audio output unit 730, an input unit 740, a sensor 750, a display unit 760, a user input unit 770, an interface unit 780, a memory 790, a processor 711, and a power supply 712. It can be understood by persons skilled in the art that the structure of the transmit end shown in FIG. 7 does not constitute a limitation on the transmit end, and the transmit end may include more or fewer components than those shown in the figure, or combine some components, or have different component arrangements. In this embodiment of the present disclosure, the transmit end includes but is not limited to a mobile phone, a tablet computer, a laptop computer, a palmtop computer, an in-vehicle terminal, a wearable device, a pedometer, and the like.

The processor 711 is configured to determine that a time domain position of a second target resource of a first transport block (TB) is after a time domain position in which feedback information corresponding to a first target resource is located, where the first target resource is a physical sidelink shared channel (PSSCH) transmission resource and/or a physical sidelink control channel (PSCCH) transmission resource; and the second target resource is a PSSCH transmission resource and/or a PSCCH transmission resource.

In this embodiment of the present disclosure, when performing resource determination, the transmit end can ensure that the allocated second target resource of the first TB is after the feedback information corresponding to the first target resource, which can avoid the waste of resources.

It should be understood that in this embodiment of the present disclosure, the radio frequency unit 710 may be configured to receive and transmit signals in an information receiving and transmitting process or a calling process. Alternatively, after downlink data is received from a network side device, the processor 711 processes the downlink data, and uplink data is transmitted to the network side device. Usually, the radio frequency unit 710 includes but is not limited to an antenna, at least one amplifier, a transceiver, a coupler, a low noise amplifier, a duplexer, and the like. In addition, the radio frequency unit 710 may communicate with a network and another device through a wireless communication system.

The transmit end provides wireless broadband Internet access for the user by using the network module 720, for example, helping the user to send and receive an e-mail, browse a web page, and access streaming media.

The audio output unit 730 may convert audio data received by the radio frequency unit 710 or the network module 720 or stored in the memory 790 into an audio signal and output the audio signal as sound. In addition, the audio output unit 730 may further provide an audio output (for example, a call signal received voice, or a message received voice) related to a specific function implemented by the transmit end 70. The audio output unit 730 includes a speaker, a buzzer, a telephone receiver, and the like.

The input unit 740 is configured to receive an audio signal or a video signal. The input unit 740 may include a graphics processing unit (GPU) 741 and a microphone 742, and the graphics processing unit 741 processes image data of a still picture or video obtained by an image capture apparatus (such as a camera) in a video capture mode or an image capture mode. A processed image frame may be displayed on the display unit 760. The image frame processed by the graphics processing unit 741 may be stored in the memory 790 (or another storage medium) or sent by using the radio frequency unit 710 or the network module 720. The microphone 742 may receive sound and can process such sound into audio data. The processed audio data may be output by being converted into a format that may be transmitted to a mobile communications network side device by using the radio frequency unit 710 in a telephone call mode.

The transmit end 70 further includes at least one type of sensor 750, such as a light sensor, a motion sensor, and another sensor. Alternatively, the light sensor includes an ambient light sensor and a proximity sensor. The ambient light sensor may adjust luminance of the display panel 761 based on brightness of ambient light. The proximity sensor may turn off the display panel 761 and/or backlight when the transmit end 70 is moved to an ear. As a type of the motion sensor, an accelerometer sensor may detect an acceleration value in each direction (generally, three axes), and detect a value and a direction of gravity when the accelerometer sensor is static, and may be configured to recognize a posture of the transmit end (such as screen switching between landscape and portrait modes, a related game, or magnetometer posture calibration), a function related to vibration recognition (such as a pedometer or a knock), and the like. The sensor 750 may further include a fingerprint sensor, a pressure sensor, an iris sensor, a molecular sensor, a gyroscope, a barometer, a hygrometer, a thermometer, an infrared sensor, and the like. Details are not described herein.

The display unit 760 is configured to display information entered by a user or information provided for a user. The display unit 760 may include the display panel 761, which can be configured in forms of a liquid crystal display (LCD), an organic light-emitting diode (OLED), or the like.

The user input unit 770 may be configured to receive input numeral or character information, and generate key signal input related to user setting and functional control of the transmit end. Alternatively, the user input unit 770 includes a touch panel 771 and another input device 772. The touch panel 771, also called a touch screen, may collect touch operation on or near the touch panel by users (for example, operation on the touch panel 771 or near the touch panel 771 by fingers or any suitable objects or accessories such as a touch pen by the users). The touch panel 771 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 711, and receives and executes a command sent by the processor 711. In addition, the touch panel 771 may be implemented in various types such as a resistor, a capacitor, an infrared ray, or a surface acoustic wave. The user input unit 770 may further include another input device 772 in addition to the touch panel 771. Alternatively, the another input device 772 may include but is not limited to a physical keyboard, a functional button (such as a volume control button or a power on/off button), a trackball, a mouse, and a joystick. Details are not described herein.

Further, the touch panel 771 may cover the display panel 761. When detecting a touch operation on or near the touch panel 771, the touch panel 771 transmits the touch operation to the processor 711 to determine a type of a touch event. Then, the processor 711 provides corresponding visual output on the display panel 761 based on the type of the touch event. In FIG. 7, the touch panel 771 and the display panel 761 are used as two independent components to implement input and output functions of the transmit end. However, in some embodiments, the touch panel 771 and the display panel 761 may be integrated to implement the input and output functions of the transmit end. This is not specifically limited herein.

The interface unit 780 is an interface for connecting an external apparatus with the transmit end 70. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 780 may be configured to receive input (for example, data information and power) from an external apparatus and transmit the received input to one or more elements in the transmit end 70 or may be configured to transmit data between the transmit end 70 and an external apparatus.

The memory 790 may be configured to store a software program and various pieces of data. The memory 790 may mainly include a program storage region and a data storage region. The program storage region may store an operating system, an application required by at least one function (such as a sound play function or an image play function), and the like. The data storage region may store data (such as audio data or an address book) created based on use of the mobile phone, and the like. In addition, the memory 790 may include a high-speed random access memory, and may further include a nonvolatile memory, for example, at least one magnetic disk storage device, a flash storage device, or another volatile solid-state storage device.

The processor 711 is a control center of the transmit end, and connects all parts of the entire transmit end by using various interfaces and lines. By running or executing a software program and/or a module stored in the memory 790 and invoking data stored in the memory 790, the processor 711 performs various functions of the transmit end and data processing, to perform overall monitoring on the transmit end. The processor 711 may include one or more processing units. Alternatively, an application processor and a modem processor may be integrated into the processor 711. The application processor mainly processes an operating system, a user interface, an application, and the like. The modem processor mainly processes wireless communications. It can be understood that, alternatively, the modem processor may not be integrated into the processor 711.

The transmit end 70 may further include the power supply 712 (such as a battery) that supplies power to each component. Alternatively, the power supply 712 may be logically connected to the processor 711 by using a power management system, so as to implement functions such as charging, discharging, and power consumption management by using the power management system.

In addition, the transmit end 70 includes some function modules not shown, and details are not described herein.

It should be further noted that the processor 710 is further configured to implement other processes in the resource determining method applied to the transmit end in the foregoing embodiment, and details are not described herein again.

Alternatively, an embodiment of the present disclosure further provides a transmit end, including: a processor 711, a memory 790, and a program or an instruction stored in the memory 790 and executable on the processor 711. When the program or the instruction is executed by the processor 711, the processes of the resource determining method embodiment applied to a transmit end side are implemented, and a same technical effect can be achieved. To avoid repetition, details are not described herein again.

An embodiment of the present disclosure further provides a readable storage medium, where the readable storage medium stores a program or an instruction, and when the program or the instruction is executed by a processor, the processes of the resource determining method embodiment applied to a transmit end side are implemented, and a same technical effect can be achieved. To avoid repetition, details are not described herein again. The computer-readable storage medium is, for example, a read-only memory (ROM for short), a random access memory (RAM for short), a magnetic disk, or an optical disk.

As shown in FIG. 8, an embodiment of the present disclosure provides a resource transmission method, applied to a transmit end, and including the following step.

Step 801. During second transport block (TB) transmission, in a case that a transmission interval between a third target resource and a fourth target resource of a second TB does not satisfy a hybrid automatic repeat request round-trip time (HARQ RTT) condition, perform transmission control, so that the transmission interval between transmission resources in the second TB transmission satisfies the HARQ RTT condition.

The third target resource is a physical sidelink shared channel (PSSCH) transmission resource and/or a physical sidelink control channel (PSCCH) transmission resource; and the fourth target resource is a PSSCH transmission resource and/or a PSCCH transmission resource.

It should be noted that the transmit end refers to a terminal that performs PSSCH and/or PSCCH transmission during the SL communication process.

It should be further noted that the second TB refers to any TB that the transmit end needs to transmit during information transmission, and both the third target resource and the fourth target resource refer to resources of the second TB at different transmission moments.

It should be noted that in this embodiment of the present disclosure, both the third target resource and the fourth target resource are HARQ feedback based PSSCH transmission resources and/or PSCCH transmission resources, and the third target resource and the fourth target resource refer to any two transmission resources of the second TB.

It should be further noted that in this embodiment of the present disclosure, that the transmission interval between the third target resource and the fourth target resource of the second TB satisfies the HARQ RTT condition is: the transmission interval between the third target resource and the fourth target resource of the second TB is greater than or greater than or equal to (in the embodiments of the present disclosure, "greater than or equal to" represents "≥") a+b.

a is a time interval between an end moment of a last symbol transmitted on a PSSCH and/or PSCCH of a third target resource and a start moment of a first symbol received on a corresponding PSFCH; and b is a receipt time of the PSFCH, a receipt and processing time of the PSFCH, or a time required for receipt and processing, and retransmission preparation of the PSFCH.

It should also be noted that the transmission resources transmitted by using the second TB in this embodiment of the present disclosure refer to resources actually transmitted by using the TB, that is, the PSSCH transmission and/or PSCCH transmission is performed on the transmission resources of the second TB.

Alternatively, in this embodiment of the present disclosure, step 801 may be implemented in at least one of the following manners:

B11. In a case that transmission of the third target resource in the second TB transmission is based on an HARQ feedback, not perform PSSCH transmission and/or PSCCH transmission on the fourth target resource that does not satisfy the HARQ RTT condition.

In other words, in this case, the transmit end does not perform transmission (namely, the PSSCH transmission and/or PSCCH transmission) on the resource that does not satisfy the HARQ RTT condition.

B12. In a case that transmission of the third target resource in the second TB transmission is based on an HARQ feedback, not perform PSSCH transmission and/or PSCCH transmission on the fourth target resource that does not satisfy the HARQ RTT condition and on all transmission resources of the second TB after the fourth target resource.

In other words, in this case, the transmit end not only does not perform transmission (namely, the PSSCH transmission and/or PSCCH transmission) on the resource that does not satisfy the HARQ RTT condition, but also does not perform transmission (namely, the PSSCH transmission and/or PSCCH transmission) on other resources after this resource.

B13. Perform blind retransmission of the PSSCH and/or blind retransmission of the PSCCH on at least the third target resource.

In other words, in this case, when any two allocated transmission resources do not satisfy the HARQ RTT condition, the transmit end needs to perform blind retransmission on at least a previous transmission resource (namely, blind retransmission of the PSSCH and/or blind retransmission of the PSCCH). That is, during transmission, sidelink control information (SCI) associated with the previous transmission resource needs to indicate that the HARQ feedback is disabled.

B14. Perform PSSCH transmission and/or PSCCH transmission on the fourth target resource after the third target resource of the second TB is transmitted.

In other words, in this case, the transmit end may continue next transmission regardless of an HARQ feedback result of the previous transmission.

B15. At least not monitor a PSFCH resource corresponding to the third target resource.

It should be noted that in the foregoing implementations, a transmission moment of the third target resource is before a transmission moment of the fourth target resource.

It should be noted that before step 801, this embodiment of the present disclosure further includes:

obtaining capability information of a receive end, where the capability information indicates that the receive end does not expect that the transmission interval between the third target resource and the fourth target resource of the second TB does not satisfy the HARQ RTT condition.

In other words, when the transmit end obtains that the receive end does not expect that the transmission interval between the third target resource and the fourth target resource of the second TB does not satisfy the HARQ RTT condition, when the transmit end performs second transport block (TB) transmission, in a case that a transmission interval between the third target resource and the fourth target resource of the second TB does not satisfy the HARQ RTT condition, transmission control is required to be performed, so that the transmission interval between transmission resources in the second TB transmission satisfies the HARQ RTT condition.

It should be further noted that when the transmit end performs TB transmission, a transmission interval between any two (or two adjacent) times of HARQ feedback based transmission (PSSCH transmission and/or PSCCH transmission) of a TB should satisfy the HARQ RTT condition, namely, greater than/greater than or equal to a+b; in other words, a plurality of transmissions of a TB (or a plurality of HARQ feedback based transmissions) cannot be corresponding to a same PSFCH opportunity.

It should be noted that in this embodiment of the present disclosure, resource transmission is limited from a perspective of the transmit end performing resource transmission, to avoid that two adjacent times of PSSCH transmission and/or PSCCH transmission do not satisfy a time limit of the HARQ RTT, which avoids the waste of resources as much as possible.

As shown in FIG. 9, an embodiment of the present disclosure provides a transmit end 900, including:

a transmission control module 901, configured to: during second transport block (TB) transmission, in a case that a transmission interval between a third target resource and a fourth target resource of a second TB does not satisfy a hybrid automatic repeat request round-trip time (HARQ RTT) condition, perform transmission control, so that the transmission interval between transmission resources in the second TB transmission satisfies the HARQ RTT condition, where the third target resource is a physical sidelink shared channel (PSSCH) transmission resource and/or a physical sidelink control channel (PSCCH) transmission resource; and the fourth target resource is a PSSCH transmission resource and/or a PSCCH transmission resource.

Alternatively, both the third target resource and the fourth target resource are HARQ feedback based PSSCH transmission resources and/or PSCCH transmission resources.

Alternatively, the transmission control module 901 is configured to implement at least one of the following:

in a case that transmission of the third target resource in the second TB transmission is based on an HARQ feedback, not performing PSSCH transmission and/or PSCCH transmission on the fourth target resource that does not satisfy the HARQ RTT condition;

in a case that transmission of the third target resource in the second TB transmission is based on an HARQ feedback, not performing PSSCH transmission and/or PSCCH transmission on the fourth target resource that does not satisfy the HARQ RTT condition and on all transmission resources of the second TB after the fourth target resource;

performing blind retransmission of the PSSCH and/or blind retransmission of the PSCCH on at least the third target resource;

performing PSSCH transmission and/or PSCCH transmission on the fourth target resource after the third target resource of the second TB is transmitted; and at least not monitoring a PSFCH resource corresponding to the third target resource, where a transmission moment of the third target resource is before a transmission moment of the fourth target resource.

Optionally, during second transport block (TB) transmission, in a case that a transmission interval between a third target resource and a fourth target resource of a second TB does not satisfy a hybrid automatic repeat request round-trip time (HARQ RTT) condition, before performing transmission control, so that the transmission interval between transmission resources in the second TB transmission satisfies the HARQ RTT condition, the transmission control module is further configured to:

obtain capability information of a receive end, where the capability information indicates that the receive end does not expect that the transmission interval between the third target resource and the fourth target resource of the second TB does not satisfy the HARQ RTT condition.

It should be noted that this transmit end embodiment is a transmit end corresponding to the resource transmission method applied to the transmit end. All implementations of the foregoing embodiments are applicable to this transmit end embodiment, and a same technical effect can also be achieved.

It should be further noted that an embodiment of the present disclosure further provides a transmit end, and a specific structure of the transmit end is the same as a specific structure of the transmit end shown in FIG. 7.

Alternatively, the processor of the transmit end is configured to: during second transport block (TB) transmission, in a case that a transmission interval between a third target resource and a fourth target resource of a second TB does not satisfy a hybrid automatic repeat request round-trip time (HARQ RTT) condition, perform transmission control, so that the transmission interval between transmission resources in the second TB transmission satisfies the HARQ RTT condition, where the third target resource is a physical sidelink shared channel (PSSCH) transmission resource and/or a physical sidelink control channel (PSCCH) transmission resource; and the fourth target resource is a PSSCH transmission resource and/or a PSCCH transmission resource.

It should be further noted that the processor of the transmit end is further configured to implement other processes in the resource transmission method applied to the transmit end in the foregoing embodiment, and details are not described herein again.

Alternatively, an embodiment of the present disclosure further provides a transmit end, including: a processor, a memory, and a program or an instruction stored in the memory and executable on the processor. When the program or the instruction is executed by the processor, the processes of the resource transmission method embodiment applied to a transmit end side are implemented, and a same technical effect can be achieved. To avoid repetition, details are not described herein again.

An embodiment of the present disclosure further provides a readable storage medium, where the readable storage medium stores a program or an instruction, and when the program or the instruction is executed by a processor, the processes of the resource transmission method embodiment applied to a transmit end side are implemented, and a same technical effect can be achieved. To avoid repetition, details are not described herein again. The computer-readable storage medium is, for example, a read-only memory (ROM for short), a random access memory (RAM for short), a magnetic disk, or an optical disk.

As shown in FIG. 10, an embodiment of the present disclosure provides a resource feedback method, applied to a receive end, and including the following step.

Step 1001. When the transmit end transmits a third transmission block (TB), in a case that a transmission interval between a fifth target resource and a sixth target resource in the third TB does not satisfy a hybrid automatic repeat request round-trip time (HARQ RTT) condition, perform feedback control based on a demodulation result for K times of physical sidelink shared channel (PSSCH) transmission and/or physical sidelink control channel (PSCCH) transmission of the third TB.

K is an integer greater than or equal to 1.

It should be noted that the receive end refers to a terminal that performs PSSCH and/or PSCCH receiving during the SL communication process.

It should be further noted that the third TB refers to any TB that the transmit end needs to transmit during information transmission. The fifth target resource and the sixth target resource refer to any two transmission resources of the third TB, that is, both the fifth target resource and the sixth target resource refer to transmission resources of the third TB at different transmission moments, and a transmission moment of the fifth target resource is earlier than a transmission moment of the sixth target resource.

It should be further noted that in this embodiment of the present disclosure, that the transmission interval between the fifth target resource and the sixth target resource of the third TB does not satisfy the HARQ RTT condition is: the transmission interval between the fifth target resource and the sixth target resource of the third TB is less than or less than or equal to (in the embodiments of the present disclosure, "less than or equal to" represents "≤") a+b.

a is a time interval between an end moment of a last symbol transmitted on a PSSCH and/or PSCCH of a fifth target resource and a start moment of a first symbol received on a corresponding PSFCH; and b is a receipt time of the PSFCH, a receipt and processing time of the PSFCH, or a time required for receipt and processing, and retransmission preparation of the PSFCH.

Alternatively, in this embodiment of the present disclosure, step 1001 may be implemented in one of the following manners:

C11. When the K times of PSSCH transmission and/or PSCCH transmission of the third TB are corresponding to a same physical sidelink feedback channel (PSFCH) opportunity, perform feedback control based on the demodulation result for the K times of PSSCH transmission and/or PSCCH transmission.

It should be further noted that in a case that there is a correctly demodulated transmission in the K times of PSSCH transmission and/or PSCCH transmission, the performing feedback control based on the demodulation result for the K times of PSSCH transmission and/or PSCCH transmission includes:

feeding back that demodulation is successful to the third TB transmission.

In other words, for the case 2 of unicast or groupcast, the receive end feeds back an acknowledgement (ACK).

Alternatively, in this case, a PSFCH that is fed back is at least one of the following:

C111. Feed back a PSFCH to the K times of PSCCH and/or PSSCH transmission.

C112. Feed back a PSFCH corresponding to a successfully demodulated PSCCH and/or PSSCH transmission.

C113. Feed back a PSFCH corresponding to M times of PSCCH and/or PSSCH transmission in the K times of PSCCH and/or PSSCH transmission, where K is greater than or equal to M, and M is an integer greater than or equal to 1.

Alternatively, the M times of PSCCH and/or PSSCH transmission includes at least one of the following:

C1131. M times of PSCCH and/or PSSCH transmission with earliest transmission times.

C1132. M times of PSCCH and/or PSSCH transmission with latest transmission times.

C1133. M times of PSCCH and/or PSSCH transmission with large frequency domain numbers.

C1134. M times of PSCCH and/or PSSCH transmission with small frequency domain numbers.

C1135. M times of PSCCH and/or PSSCH transmission randomly selected in the K times of PSCCH and/or PSSCH transmission.

It should be further noted that M may be defined in the protocol, or configured or preconfigured by the control node. Alternatively, M=1. Optionally, the M times in this embodiment of the present disclosure may also be a collection of resources, where previous resource intervals of these resources satisfy the HARQ RTT time. For example, if a resource 3 is the first to satisfy the HARQ RTT time after a resource 1, and a resource 4 is the first to satisfy the HARQ RTT time after the resource 3, then PSFCHs of the resource 1, the resource 3, and the resource 4 are transmitted.

It should be noted that in this case, the receive end may not provide a PSFCH feedback for remaining K-M times of PSCCH and/or PSSCH transmission; or may also perform low-priority processing on PSFCH feedbacks corresponding to the K-M times of PSCCH and/or PSSCH transmission. Further, the low-priority processing includes: in a case that there are a plurality of PSFCH feedbacks in a PSFCH opportunity corresponding to this PSCCH and/or PSSCH transmission, when the receive end discards the PSFCH feedback, preferentially discarding a PSFCH feedback corresponding to the K-M times of PSCCH and/or PSSCH transmission. Optionally, before the receive end selects a plurality of PSFCHs based on priority, the low-priority processing may be executed. Optionally, when the receive end selects a plurality of PSFCHs based on the priority, if there are a plurality of PSFCHs with a same priority, the low-priority processing may be executed.

It should be further noted that in a case that there is not a correctly demodulated transmission in the K times of PSSCH transmission and/or PSCCH transmission, the performing feedback control based on the demodulation result for the K times of PSSCH transmission and/or PSCCH transmission includes:

feeding back that demodulation is failed to the third TB transmission.

In other words, in this case, the transmit end feeds back a negative acknowledgement (NACK) to the third TB.

Alternatively, in this case, a PSFCH that is fed back is at least one of the following:

C114. Feed back a PSFCH to the K times of PSCCH and/or PSSCH transmission.

C115. Feed back a PSFCH corresponding to M times of PSCCH and/or PSSCH transmission in the K times of PSCCH and/or PSSCH transmission, where K is greater than or equal to M, and M is an integer greater than or equal to 1.

Alternatively, the M times of PSCCH and/or PSSCH transmission includes at least one of the following:

C1151. M times of PSCCH and/or PSSCH transmission with earliest transmission times.

C1152. M times of PSCCH and/or PSSCH transmission with latest transmission times.

C1153. M times of PSCCH and/or PSSCH transmission with large frequency domain numbers.

C1154. M times of PSCCH and/or PSSCH transmission with small frequency domain numbers.

C1155. M times of PSCCH and/or PSSCH transmission randomly selected in the K times of PSCCH and/or PSSCH transmission.

It should be further noted that M may be defined in the protocol, or configured or preconfigured by the control node. Alternatively, M=1. Optionally, the M times in this embodiment of the present disclosure may also be a collection of resources, where previous resource intervals of these resources satisfy the HARQ RTT time. For example, if a resource 3 is the first to satisfy the HARQ RTT time after a resource 1, and a resource 4 is the first to satisfy the HARQ RTT time after the resource 3, then PSFCHs of the resource 1, the resource 3, and the resource 4 are transmitted.

It should be noted that in this case, the receive end may not provide a PSFCH feedback for remaining K-M times of PSCCH and/or PSSCH transmission; or may also perform low-priority processing on PSFCH feedbacks corresponding to the K-M times of PSCCH and/or PSSCH transmission. Further, the low-priority processing includes: in a case that there are a plurality of PSFCH feedbacks in a PSFCH opportunity corresponding to this PSCCH and/or PSSCH transmission, when the receive end discards the PSFCH feedback, preferentially discarding a PSFCH feedback corresponding to the K-M times of PSCCH and/or PSSCH transmission. Optionally, before the receive end selects a plurality of PSFCHs based on priority, the low-priority processing may be executed. Optionally, when the receive end selects a plurality of PSFCHs based on the priority, if there are a plurality of PSFCHs with a same priority, the low-priority processing may be executed.

It should be noted that the premise of the foregoing implementation is that the third TB transmission has not been successfully demodulated before the K times of PSSCH and/or PSCCH transmission.

C12. When the K times of PSSCH transmission and/or PSCCH transmission of the third TB are corresponding to different PSFCH opportunities, perform feedback control on a second transmission based on a demodulation result corresponding to a first transmission, where a transmission time of the first transmission is before a transmission time of the second transmission, and a PSFCH opportunity corresponding to the first transmission is before a PSFCH opportunity corresponding to the second transmission.

It should be noted that the second transmission refers to the current transmission, while the first transmission refers to at least one time of transmission before the second transmission.

It should be further noted that in this case, if the receive end successfully demodulates the first transmission and performs a corresponding PSFCH feedback, at least one of the following is used to perform feedback control on the second transmission:

C121. Feed back that demodulation is successful to the second transmission.

C122. Not feed back the PSFCH to the second transmission.

C123. Perform low-priority processing on the PSFCH that is fed back in the second transmission.

It should be noted that the performing low-priority processing on the PSFCH that is fed back in the second transmission includes: in a case that there are a plurality of PSFCH feedbacks in a PSFCH opportunity corresponding to the second transmission, when the receive end needs to discard the PSFCH feedback, preferentially discarding a PSFCH feedback corresponding to the second transmission. Optionally, before the receive end selects a plurality of PSFCHs based on priority, the low-priority processing may be executed. Optionally, when the receive end selects a plurality of PSFCHs based on the priority, if there are a plurality of PSFCHs with a same priority, the low-priority processing may be executed.

It should be further noted that in this case, if failing to demodulate the first transmission, the receive end uses the prior art to perform feedback to the second transmission. That is, for the case 2 of unicast or groupcast, the receive end feeds back an acknowledgement or a negative acknowledgement based on a demodulation result of the second transmission. For the case 1 of groupcast, if failing to demodulate the second transmission, the receive end feeds back a negative acknowledgement; and if demodulating the second transmission successfully, the receive end does not feed back information.

It should be noted that in this embodiment of the present disclosure, resource feedback is limited from a perspective of the receive end performing resource feedback, to avoid that two adjacent times of PSSCH transmission and/or PSCCH transmission do not satisfy a time limit of the HARQ RTT, which can reduce the redundancy of feedback information.

Figures 11, 12, 13:
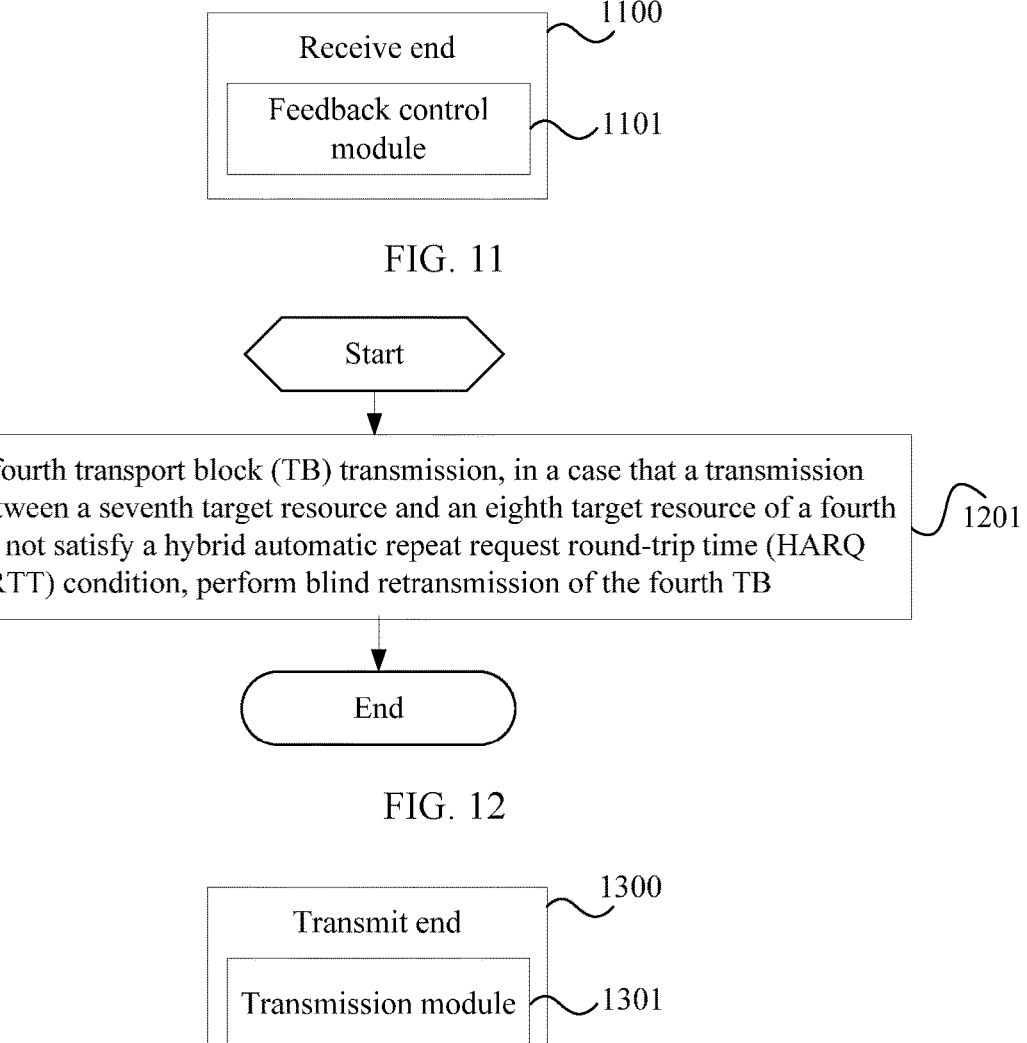
FIG. 11 is a schematic diagram of modules of a receive end according to an embodiment of the present disclosure.
FIG. 12 is a second schematic flowchart of a resource transmission method according to an embodiment of the present disclosure.
FIG. 13 is a third schematic diagram of modules of a transmit end according to an embodiment of the present disclosure.

As shown in FIG. 11, an embodiment of the present disclosure provides a receive end 1100, including:

a feedback control module 1101, configured to: when the transmit end transmits a third transmission block (TB), in a case that a transmission interval between a fifth target resource and a sixth target resource in the third TB does not satisfy a hybrid automatic repeat request round-trip time (HARQ RTT) condition, perform feedback control based on a demodulation result for K times of physical sidelink shared channel (PSSCH) transmission and/or physical sidelink control channel (PSCCH) transmission of the third TB, where K is an integer greater than or equal to 1.

Optionally, the feedback control module 1101 includes one of the following:

a first control unit, configured to: when the K times of PSSCH transmission and/or PSCCH transmission of the third TB are corresponding to a same physical sidelink feedback channel (PSFCH) opportunity, perform feedback control based on the demodulation result for the K times of PSSCH transmission and/or PSCCH transmission; and a second control unit, configured to: when the K times of PSSCH transmission and/or PSCCH transmission of the third TB are corresponding to different PSFCH opportunities, perform feedback control on a second transmission based on a demodulation result corresponding to a first transmission, where a transmission time of the first transmission is before a transmission time of the second transmission, and a physical sidelink feedback channel (PSFCH) opportunity corresponding to the first transmission is before a PSFCH opportunity corresponding to the second transmission.

Further, in a case that there is a correctly demodulated transmission in the K times of PSSCH transmission and/or PSCCH transmission, the first control unit is configured to:

feed back that demodulation is successful to the third TB transmission, where a PSFCH that is fed back is at least one of the following:

feeding back a PSFCH to the K times of PSCCH and/or PSSCH transmission;

feeding back a PSFCH corresponding to a successfully demodulated PSCCH and/or PSSCH transmission; and feeding back a PSFCH corresponding to M times of PSCCH and/or PSSCH transmission in the K times of PSCCH and/or PSSCH transmission, where K is greater than or equal to M, and M is an integer greater than or equal to 1.

Further, in a case that there is not a correctly demodulated transmission in the K times of PSSCH transmission and/or PSCCH transmission, the first control unit is configured to:

feed back that demodulation is failed to the third TB transmission, where a PSFCH that is fed back is at least one of the following:

feeding back a PSFCH to the K times of PSCCH and/or PSSCH transmission; and feeding back a PSFCH corresponding to M times of PSCCH and/or PSSCH transmission in the K times of PSCCH and/or PSSCH transmission, where K is greater than or equal to M, and M is an integer greater than or equal to 1.

Alternatively, during feeding back a PSFCH corresponding to M times of PSCCH and/or PSSCH transmission in the K times of PSCCH and/or PSSCH transmission, the receive end further includes at least one of the following:

a first processing module, configured to not perform a PSFCH feedback for K-M times of PSCCH and/or PSSCH transmission; and a second processing module, configured to perform low-priority processing on a PSFCH feedback corresponding to the K-M times of PSCCH and/or PSSCH transmission.

Alternatively, the low-priority processing includes: in a case that there are a plurality of PSFCH feedbacks in a PSFCH opportunity corresponding to this PSCCH and/or PSSCH transmission, when the receive end discards the PSFCH feedback, preferentially discarding a PSFCH feedback corresponding to the K-M times of PSCCH and/or PSSCH transmission.

Alternatively, the M times of PSCCH and/or PSSCH transmission includes at least one of the following:

M times of PSCCH and/or PSSCH transmission with earliest transmission times;

M times of PSCCH and/or PSSCH transmission with latest transmission times;

M times of PSCCH and/or PSSCH transmission with large frequency domain numbers;

M times of PSCCH and/or PSSCH transmission with small frequency domain numbers; and M times of PSCCH and/or PSSCH transmission randomly selected in the K times of PSCCH and/or PSSCH transmission.

Further, the second control unit is configured to:

in a case that the receive end successfully demodulates the first transmission and performs a corresponding PSFCH feedback, use at least one of the following to perform feedback control on the second transmission:

feeding back that demodulation is successful to the second transmission;

not feeding back the PSFCH to the second transmission; and performing low-priority processing on the PSFCH that is fed back in the second transmission.

Alternatively, the performing low-priority processing on the PSFCH that is fed back in the second transmission includes:

in a case that there are a plurality of PSFCH feedbacks in a PSFCH opportunity corresponding to the second transmission, when the receive end needs to discard the PSFCH feedback, preferentially discarding a PSFCH feedback corresponding to the second transmission.

It should be noted that this receive end embodiment is a receive end corresponding to the resource feedback method applied to the receive end. All implementations of the foregoing embodiments are applicable to this receive end embodiment, and a same technical effect can also be achieved.

It should be further noted that an embodiment of the present disclosure further provides a receive end, and a specific structure of the receive end is the same as a specific structure of the transmit end shown in FIG. 7.

Alternatively, the processor of the receive end is configured to: when the transmit end transmits a third transmission block (TB), in a case that a transmission interval between a fifth target resource and a sixth target resource in the third TB does not satisfy a hybrid automatic repeat request round-trip time (HARQ RTT) condition, perform feedback control based on a demodulation result for K times of physical sidelink shared channel (PSSCH) transmission and/or physical sidelink control channel (PSCCH) transmission of the third TB, where K is an integer greater than or equal to 1.

It should be further noted that the processor of the receive end is further configured to implement other processes in the resource feedback method applied to the receive end in the foregoing embodiment, and details are not described herein again.

Alternatively, an embodiment of the present disclosure further provides a receive end, including: a processor, a memory, and a program or an instruction stored in the memory and executable on the processor. When the program or the instruction is executed by the processor, the processes of the resource feedback method embodiment applied to a receive end side are implemented, and a same technical effect can be achieved. To avoid repetition, details are not described herein again.

An embodiment of the present disclosure further provides a readable storage medium, where the readable storage medium stores a program or an instruction, and when the program or the instruction is executed by a processor, the processes of the resource feedback method embodiment applied to a receive end side are implemented, and a same technical effect can be achieved. To avoid repetition, details are not described herein again. The computer-readable storage medium is, for example, a read-only memory (ROM for short), a random access memory (RAM for short), a magnetic disk, or an optical disc.

As shown in FIG. 12, an embodiment of the present disclosure further provides a resource transmission method, applied to a transmit end, and including the following step.

Step 1201. During fourth transport block (TB) transmission, in a case that a transmission interval between a seventh target resource and an eighth target resource of a fourth TB does not satisfy a hybrid automatic repeat request round-trip time (HARQ RTT) condition, perform blind retransmission of the fourth TB.

The seventh target resource is a physical sidelink shared channel (PSSCH) transmission resource and/or a physical sidelink control channel (PSCCH) transmission resource; and the eighth target resource is a PSSCH transmission resource and/or a PSCCH transmission resource.

It should be noted that the transmit end refers to a terminal that performs PSSCH and/or PSCCH transmission during the SL communication process.

It should be further noted that the fourth TB refers to any TB that the transmit end needs to transmit during information transmission, and both the seventh target resource and the eighth target resource refer to resources of the fourth TB at different transmission moments.

It should be noted that in this embodiment of the present disclosure, both the seventh target resource and the eighth target resource are HARQ feedback based PSSCH transmission resources and/or PSCCH transmission resources, and the seventh target resource and the eighth target resource refer to any two transmission resources of the fourth TB.

It should be further noted that in this embodiment of the present disclosure, that the transmission interval between the seventh target resource and the eighth target resource of the fourth TB does not satisfy the HARQ RTT condition is: the transmission interval between the seventh target resource and the eighth target resource of the fourth TB is less than or less than or equal to (in the embodiments of the present disclosure, "less than or equal to" represents "≤") a+b.

a is a time interval between an end moment of a last symbol transmitted on a PSSCH and/or PSCCH of a seventh target resource and a start moment of a first symbol received on a corresponding PSFCH; and b is a receipt time of the PSFCH, a receipt and processing time of the PSFCH, or a time required for receipt and processing, and retransmission preparation of the PSFCH.

It should be noted that in this embodiment of the present disclosure, when the transmission interval between transmission resources of a TB does not satisfy the HARQ RTT condition, TB blind retransmission is directly performed to improve the success rate of TB transmission.

As shown in FIG. 13, an embodiment of the present disclosure provides a transmit end 1300, including:

a transmission module 1301, configured to: during fourth transport block (TB) transmission, in a case that a transmission interval between a seventh target resource and an eighth target resource of a fourth TB does not satisfy a hybrid automatic repeat request round-trip time (HARQ RTT) condition, perform blind retransmission of the fourth TB, where the seventh target resource is a physical sidelink shared channel (PSSCH) transmission resource and/or a physical sidelink control channel (PSCCH) transmission resource; and the eighth target resource is a PSSCH transmission resource and/or a PSCCH transmission resource.

It should be noted that this transmit end embodiment is a transmit end corresponding to the resource transmission method applied to the transmit end. All implementations of the foregoing embodiments are applicable to this transmit end embodiment, and a same technical effect can also be achieved.

It should be further noted that an embodiment of the present disclosure further provides a transmit end, and a specific structure of the transmit end is the same as a specific structure of the transmit end shown in FIG. 7.

Alternatively, the processor of the transmit end is configured to: during fourth transport block (TB) transmission, in a case that a transmission interval between a seventh target resource and an eighth target resource of a fourth TB does not satisfy a hybrid automatic repeat request round-trip time (HARQ RTT) condition, perform blind retransmission of the fourth TB, where the seventh target resource is a physical sidelink shared channel (PSSCH) transmission resource and/or a physical sidelink control channel (PSCCH) transmission resource; and the eighth target resource is a PSSCH transmission resource and/or a PSCCH transmission resource.

It should be further noted that the processor of the transmit end is further configured to implement other processes in the resource transmission method applied to the transmit end in the foregoing embodiment, and details are not described herein again.

Alternatively, an embodiment of the present disclosure further provides a transmit end, including: a processor, a memory, and a program or an instruction stored in the memory and executable on the processor. When the program or the instruction is executed by the processor, the processes of the resource transmission method embodiment applied to a transmit end side are implemented, and a same technical effect can be achieved. To avoid repetition, details are not described herein again.

An embodiment of the present disclosure further provides a readable storage medium, where the readable storage medium stores a program or an instruction, and when the program or the instruction is executed by a processor, the processes of the resource transmission method embodiment applied to a transmit end side are implemented, and a same technical effect can be achieved. To avoid repetition, details are not described herein again. The computer-readable storage medium is, for example, a read-only memory (ROM for short), a random access memory (RAM for short), a magnetic disk, or an optical disc.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element.

"And/or" used in this specification and claims of this application means at least one of the associated objects. For example, "A and/or B" represents the following three cases: Only A exists, only B exists, or both A and B exist; and "at least one of A and B" also represents the following three cases: only A exists, only B exists, or both A and B exist.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network side device, or the like) to perform the methods described in the embodiments of the present disclosure.

The foregoing embodiments are preferred embodiments of the present disclosure. It should be noted that, within the technical concept of the present disclosure, a person of ordinary skill in the art can make various improvements and modifications, which shall all fall within the protection scope of the present disclosure.

The invention claimed is:

1. A resource determining method performed by a transmit end, comprising:

determining that a time domain position of a second target resource of a first transport block (TB) is after a time domain position in which feedback information corresponding to a first target resource is located, wherein the first target resource is at least one of a physical sidelink shared channel (PSSCH) transmission resource or a physical sidelink control channel (PSCCH) transmission resource; and the second target resource is at least one of a PSSCH transmission resource or a PSCCH transmission resource;

wherein the determining that a time domain position of a second target resource of a first transport block (TB) is after a time domain position in which feedback information corresponding to a first target resource is located comprises:

during resource allocation, a time interval between allocating the first target resource and the second target resource of the first TB being at least greater than (">") or greater than or equal to ("≥") a hybrid automatic repeat request round-trip time (HARQ RTT), and for transmission resources of other TBs that are periodically reserved after the time domain resource in which the first TB is located, a time interval between reserved transmission resources in each period being at least greater than or greater than or equal to the HARQ RTT;

wherein a same sidelink process or sidelink reservation process cannot be simultaneously used for hybrid automatic repeat request (HARQ) feedback based retransmission and blind retransmission.

2. The resource determining method according to claim 1, wherein the determining that a time domain position of a second target resource of a first transport block (TB) is after a time domain position in which feedback information corresponding to a first target resource is located further comprises at least one of the following:

during resource allocation, a time interval between allocating the first target resource and the second target resource of the first TB being at least greater than or greater than or equal to a physical sidelink feedback channel (PSFCH) period;

during resource reservation, in a case that a process in
which the first TB is located supports periodic reser-
vation, configuring a resource reservation period of the
process in which the first TB is located to be an integer
multiple of the PSFCH period, wherein the process is
a sidelink process or a sidelink reservation process;
during resource allocation, a time interval between allo-
cating the first target resource and the second target
resource of the first TB being at least greater than or
greater than or equal to a maximum HARQ RTT, and
for transmission resources of other TBs that are peri-
odically reserved after the time domain resource in
which the first TB is located, a time interval between
reserved transmission resources in each period being at
least greater than or greater than or equal to the HARQ
RTT;
during resource reservation, a time interval between the
first target resource and the second target resource of
the first TB being at least greater than or greater than or
equal to the HARQ RTT; or
obtaining a resource that a control node allocates to a
transmit end during resource allocation, wherein an
expectation of the transmit end to the allocated resource
is that a time interval between the first target resource
and the second target resource of the first TB is at least
greater than or greater than or equal to the HARQ RTT.
3. The resource determining method according to claim 1,
wherein the second target resource and the first target
resource are used for at least one of HARQ feedback based
PSSCH retransmission or PSCCH retransmission.
4. A transmit end, comprising:
a processor; and
a memory storing a program or an instruction that is
executable on the processor, wherein the program or
the instruction, when executed by the processor, causes
the transmit end to perform the following steps:
determining that a time domain position of a second target
resource of a first transport block (TB) is after a time
domain position in which feedback information corre-
sponding to a first target resource is located, wherein
the first target resource is at least one of a physical
sidelink shared channel (PSSCH) transmission
resource or a physical sidelink control channel
(PSCCH) transmission resource; and the second target
resource is at least one of a PSSCH transmission
resource or a PSCCH transmission resource;
wherein the determining that a time domain position of a
second target resource of a first transport block (TB) is
after a time domain position in which feedback infor-
mation corresponding to a first target resource is
located comprises:
during resource allocation, a time interval between allo-
cating the first target resource and the second target
resource of the first TB being at least greater than (">")
or greater than or equal to ("≥") a hybrid automatic
repeat request round-trip time (HARQ RTT), and for
transmission resources of other TBs that are periodi-
cally reserved after the time domain resource in which
the first TB is located, a time interval between reserved
transmission resources in each period being at least
greater than or greater than or equal to the HARQ RTT;

wherein a same sidelink process or sidelink reservation
process cannot be simultaneously used for hybrid auto-
matic repeat request (HARQ) feedback based retrans-
mission and blind retransmission.
5. The transmit end according to claim 4, wherein the
determining that a time domain position of a second target
resource of a first transport block (TB) is after a time domain
position in which feedback information corresponding to a
first target resource is located further comprises at least one
of the following:
during resource allocation, a time interval between allo-
cating the first target resource and the second target
resource of the first TB being at least greater than or
greater than or equal to a physical sidelink feedback
channel (PSFCH) period;
during resource reservation, in a case that a process in
which the first TB is located supports periodic reser-
vation, configuring a resource reservation period of the
process in which the first TB is located to be an integer
multiple of the PSFCH period, wherein the process is
a sidelink process or a sidelink reservation process;
during resource allocation, a time interval between allo-
cating the first target resource and the second target
resource of the first TB being at least greater than or
greater than or equal to a maximum HARQ RTT, and
for transmission resources of other TBs that are peri-
odically reserved after the time domain resource in
which the first TB is located, a time interval between
reserved transmission resources in each period being at
least greater than or greater than or equal to the HARQ
RTT;
during resource reservation, a time interval between the
first target resource and the second target resource of
the first TB being at least greater than or greater than or
equal to the HARQ RTT; or
obtaining a resource that a control node allocates to a
transmit end during resource allocation, wherein an
expectation of the transmit end to the allocated resource
is that a time interval between the first target resource
and the second target resource of the first TB is at least
greater than or greater than or equal to the HARQ RTT.
6. The transmit end according to claim 4, wherein the
second target resource and the first target resource are used
for at least one of HARQ feedback based PSSCH retrans-
mission or PSCCH retransmission.
7. A non-transitory readable storage medium storing a
program or an instruction, wherein the program or the
instruction, when executed by a processor, causes the pro-
cessor to perform the resource determining method accord-
ing to claim 1.
8. A non-transitory readable storage medium storing a
program or an instruction, wherein the program or the
instruction, when executed by a processor, causes the pro-
cessor to perform the resource determining method accord-
ing to claim 2.
9. A non-transitory readable storage medium storing a
program or an instruction, wherein the program or the
instruction, when executed by a processor, causes the pro-
cessor to perform the resource determining method accord-
ing to claim 3.

* * * * *